US012785980B2

(12) United States Patent
Ezrielev et al.

(10) Patent No.: US 12,785,980 B2
(45) Date of Patent: Nov. 3, 2026

(54) MANAGING VERIFICATION OF DATA AS NON-SYNTHETIC DATA

(71) Applicant: Dell Products L.P., Round Rock, TX (US)

(72) Inventors: Ofir Ezrielev, Be'er Sheva (IL); Tomer Kushnir, Omer (IL); Yehiel Zohar, Sderot (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/928,793

(22) Filed: Oct. 28, 2024

(65) Prior Publication Data

US 2026/0121864 A1 Apr. 30, 2026

(51) Int. Cl.
*H04L 9/32* (2006.01)
*H04L 9/08* (2006.01)

(52) U.S. Cl.
CPC .......... *H04L 9/3236* (2013.01); *H04L 9/0825* (2013.01); *H04L 9/3228* (2013.01); *H04L 9/3247* (2013.01)

(58) Field of Classification Search
CPC ... H04L 9/3236; H04L 9/0825; H04L 9/3228; H04L 9/3247
See application file for complete search history.

(56) References Cited

U.S. PATENT DOCUMENTS 6,892,913 B1 5/2005 Andersson
7,822,631 B1 10/2010 Vander Mey
8,060,812 B2 11/2011 Branda et al.
8,126,820 B1 2/2012 Talan
(Continued)

FOREIGN PATENT DOCUMENTS

AU 2013329525 C1 3/2017
CN 113811913 B 11/2022
(Continued)

OTHER PUBLICATIONS

Nader Bouacida, "Vulnerabilities Federated Learning," 2021, pp. 1-21 (Year: 2021).*
(Continued)

*Primary Examiner* — Luu T Pham
*Assistant Examiner* — Canh Le
(74) *Attorney, Agent, or Firm* — WOMBLE BOND DICKINSON (US) LLP

(57) ABSTRACT

Methods and systems for verifying data used to provide computer-implemented services as non-synthetic data without obtaining a copy of the data are disclosed. To do so, a data poisoning pattern may be provided for use in obtaining poisoned data using the data and a hash of the poisoned data may be obtained. In response to obtaining the hash of the poisoned data, an inference generation process may be initiated to obtain an inference generated by an inference model and a second hash of the poisoned data generated by the inference model. The inference model may be trained to identify data poisoning patterns using poisoned data as ingest. If the second hash matches the hash and the inference correctly identifies the data poisoning pattern, it may be determined that the data is verified as non-synthetic data. The hash of the poisoned data may then be stored in a data repository.

20 Claims, 7 Drawing Sheets

(56) References Cited

U.S. PATENT DOCUMENTS

| | | | | |
|---|---|---|---|---|
| 8,392,702 | B2 * | 3/2013 | Qiu | H04L 63/101 380/279 |
| 8,650,646 | B2 | 2/2014 | Rubin et al. | |
| 8,856,936 | B2 | 10/2014 | Datta Ray et al. | |
| 9,043,458 | B2 * | 5/2015 | Balaji | H04L 67/10 709/224 |
| 9,563,782 | B1 | 2/2017 | Brisebois | |
| 10,122,775 | B2 | 11/2018 | Rosenberg | |
| 10,140,466 | B1 | 11/2018 | Brisebois | |
| 10,223,701 | B2 | 3/2019 | King | |
| 11,059,348 | B2 | 7/2021 | Yu et al. | |
| 11,314,492 | B2 | 4/2022 | Jain | |
| 11,354,602 | B2 | 6/2022 | Kursun | |
| 11,704,409 | B2 | 7/2023 | Miller et al. | |
| 11,861,937 | B2 | 1/2024 | Han et al. | |
| 12,204,507 | B1 | 1/2025 | Ghosh | |
| 12,302,027 | B2 * | 5/2025 | Krishna | H04N 5/2628 |
| 2004/0093323 | A1 | 5/2004 | Bluhm | |
| 2008/0244526 | A1 | 10/2008 | Chang | |
| 2009/0319539 | A1 | 12/2009 | Soppet | |
| 2010/0250605 | A1 | 9/2010 | Pamu | |
| 2011/0060664 | A1 | 3/2011 | Bezos | |
| 2011/0088086 | A1 | 4/2011 | Swink | |
| 2013/0239170 | A1 | 9/2013 | Ziemann | |
| 2015/0113002 | A1 | 4/2015 | Nadarajah | |
| 2015/0281222 | A1 * | 10/2015 | Burch | H04L 63/0838 726/6 |
| 2016/0005004 | A1 | 1/2016 | Trabue | |
| 2016/0210427 | A1 | 7/2016 | Mynhier | |
| 2016/0357980 | A1 | 12/2016 | Balasubramanian | |
| 2017/0364831 | A1 | 12/2017 | Ghosh | |
| 2018/0284712 | A1 | 10/2018 | Mathur | |
| 2018/0336571 | A1 | 11/2018 | Gilani | |
| 2019/0349204 | A1 | 11/2019 | Enke | |
| 2020/0152321 | A1 | 5/2020 | Perry | |
| 2020/0183911 | A1 | 6/2020 | Patel | |
| 2020/0202308 | A1 | 6/2020 | Cattone | |
| 2021/0142217 | A1 | 5/2021 | Valline | |
| 2021/0217092 | A1 | 7/2021 | Webster | |
| 2021/0250361 | A1 * | 8/2021 | Leibmann | G06F 21/33 |
| 2022/0147009 | A1 | 5/2022 | Cooley | |
| 2022/0261694 | A1 | 8/2022 | Ho | |
| 2022/0345523 | A1 | 10/2022 | Maity | |
| 2022/0391821 | A1 | 12/2022 | Boyd | |
| 2023/0004888 | A1 | 1/2023 | Li | |
| 2023/0412626 | A1 * | 12/2023 | Wright | H04L 41/16 |
| 2024/0202737 | A1 | 6/2024 | Sethi | |
| 2025/0190612 | A1 * | 6/2025 | Chandrashekar | G06F 21/6227 |
| 2025/0200786 | A1 | 6/2025 | St. Martin | |
| 2025/0245773 | A1 * | 7/2025 | Hanes | H04N 7/18 |
| 2025/0363775 | A1 * | 11/2025 | Gupta | G06V 10/25 |

FOREIGN PATENT DOCUMENTS

| | | | |
|---|---|---|---|
| CN | 118153979 | A | 6/2024 |
| CN | 118317314 | A | 7/2024 |
| GB | 2456742 | A | 7/2009 |
| GB | 2507837 | A | 5/2014 |
| WO | 2024091682 | A1 | 5/2024 |
| WO | 2024186954 | A2 | 9/2024 |

OTHER PUBLICATIONS

Carl E.J Brodzinski, Security and Data attacks on machine unlearning in financial and E-commerce, 2024, pp. 1-14. (Year: 2024 ).*

"Digital Authenticity: Provenance and Verification in AI-Generated Media". Webpage <https://www.numbersprotocol.io/blog/digital-authenticity-provenance-and-verification-in-ai-generated-media>, 9 pages, Dec. 5, 2023, retrieved from Internet Archive Wayback Machine <https://web.archive.org/web/20240113104942/https://www.numbersprotocol.io/blog/digital-authenticity-provenance-and-verification-in-ai-generated-media> on Sep. 26, 2024.

Adam Rowe, "9 Simple Ways to Detect AI Images (With Examples) in 2024", tech.co, Nov. 22, 2023, retrieved from <https://tech.co/news/ways-detect-ai-images-examples> on Sep. 26, 2024 (6 pages).

Zhong et al., "Rich and Poor Texture Contrast: A Simple yet Effective Approach for AI-generated Image Detection", arXiv:2311.12397v2, Dec. 10, 2023 (17 pages).

Sina Mchunu, "How to Detect AI Content in 2024", WebFX, May 19, 2023, retrieved from <https://www.webfx.com/blog/content-marketing/how-to-detect-ai-content/> retrieved on Sep. 26, 2024 (12 pages).

Rachel Gordon, "Better fact-checking for fake news", MIT News on Campus and Around the World, Oct. 17, 2019 (7 pages).

Harran et al., "A Method for Verifying Integrity and Authenticating Digital Media", Forensic Focus, Jun. 9, 2017, retrieved from <https://www.forensicfocus.com/articles/a-method-for-verifying-integrity-and-authenticating-digital-media/> on Sep. 26, 2024 (16 pages).

Boland et al., "Ten Simple Rules to Enable Multi-site Collaborations through Data Sharing", PLoS Comput Biol. Jan. 19, 2017;13(1):e1005278. doi: 10.1371/journal.pcbi.1005278. PMID: 28103227; PMCID: PMC5245793, retrieved from <https://www.ncbi.nlm.nih.gov/pmc/articles/PMC5245793/> on Sep. 26, 2024 (15 pages).

Kate Vitasek, "Collaborative Bidding? It's Not an Oxymoron", Forbes, updated Jun. 26, 2018, retrieved from <https://www.forbes.com/sites/katevitasek/2018/06/26/collaborative-bidding-its-not-an-oxymoron/> on Sep. 26, 2024 (5 pages).

"Analyzing Bids and Awarding Events", Oracle, People Soft Strategic Sourcing 9.1 PeopleBook, 13 pages, retrieved from <https://docs.oracle.com/cd/E27605_01/fscm91pbr2/eng/psbooks/mssg/chapter.htm?File=mssg/htm/mssg16.htm> on Sep. 26, 2024.

"Ensuring Data Integrity with Hash Codes", Microsoft, Jan. 3, 2023, retrieved from <https://learn.microsoft.com/en-us/dotnet/standard/security/ensuring-data-integrity-with-hash-codes> on Sep. 26, 2024 (3 pages).

Menno van Zaanen, "Bootstrapping Structure using Similarity", arXiv:cs/0104005v1, Apr. 3, 2001, retrieved from <https://arxiv.org/abs/cs/0104005> on Oct. 23, 2024 (11 pages).

Bacher et al., "A Non-Parametric Subspace Analysis Approach with Application to Anomaly Detection Ensembles", arXiv:2101.04932, Jan. 13, 2024, retrieved from https://arxiv.org/abs/2101.04932 on Oct. 23, 2024 (41 pages).

Prothero et al., "Data Integration Via Analysis of Subspaces (DIVAS)", arXiv:2212.00703, Jan. 18, 2024, retrieved from https://arxiv.org/abs/2212.00703, on Oct. 23, 2024 (52 pages).

N. Godewithana and G. Kirindage, "Intelligent Hybrid Chatbot Solution for Archaeological Sites Tracking", 2021 6th International Conference on Inventive Computation Technologies (ICICT), Coimbatore, India, 2021, https://ieeexplore.ieee.org/document/9358784?source=IQplus (Year 2021), pp. 517-522 (6 pages).

* cited by examiner

MANAGING VERIFICATION OF DATA AS NON-SYNTHETIC DATA

FIELD

Embodiments disclosed herein relate generally to managing data used to provide computer-implemented services. More particularly, embodiments disclosed herein relate to systems and methods to manage verification of data as non-synthetic data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
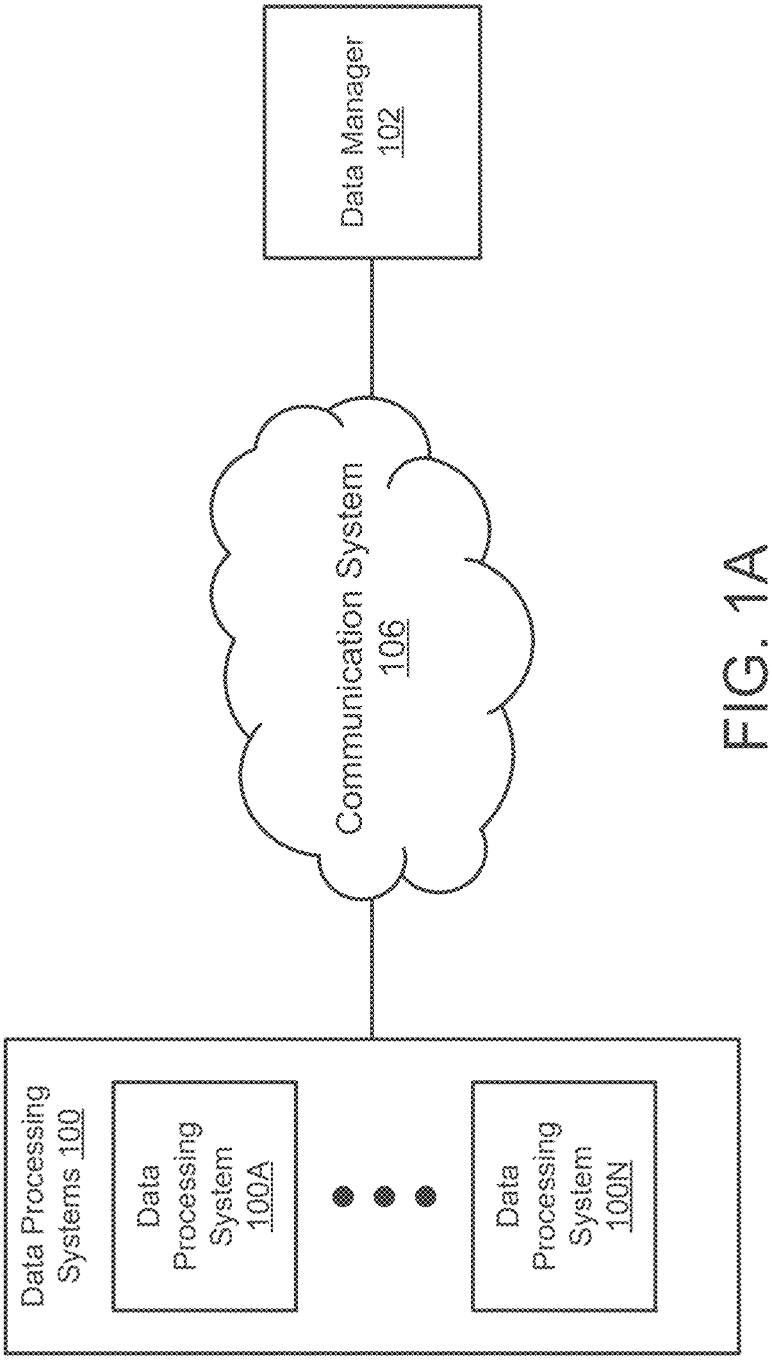
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data used to provide computer-implemented services. The data may include any type and/or quantity of data obtained from any number of data sources, and a quality of the computer-implemented services may be impacted by a quality of the data. For example, inclusion of synthetic data (e.g., generated by a generative artificial intelligence (AI) model) in a dataset may reduce a quality of the dataset, thereby reducing a quality of computer-implemented services provided using the dataset.

For example, a data consumer may use the dataset to train an inference model (e.g., an artificial intelligence (AI) model) and/or the dataset may be used to generate prompts (e.g., ingest) for the inference model. Consequently, computer-implemented services provided using outputs from the inference model may be negatively impacted (e.g., may not meet needs of the data consumer and/or other downstream consumers).

To improve a likelihood of providing non-synthetic data to data consumers, a data repository may be populated with verified (e.g., non-synthetic) data. To do so, upon generation of non-synthetic data, a verification procedure may be performed. However, the data generated by data sources may include sensitive information (e.g., personally identifiable information (PII) for an individual, confidential information for a business) that an owner of the data may not wish to expose to external entities (e.g., an entity performing the verification process).

To reduce a likelihood of exposure of the sensitive information included in the data, the verification procedure may be performed (e.g., by a data manager) without the data manager obtaining the data from the data source. To do so, the data manager may initiate a data poisoning process based on a data poisoning pattern that includes a sequence of noise. The data poisoning pattern may be provided (e.g., to a data poisoner) prior to the initiating of the data poisoning process and the data poisoning pattern may, therefore, be known to the data poisoner and the data manager at the time of the data poisoning process. The data poisoner and/or the data source may add the sequence of noise to the data to obtain poisoned data. The data source may generate a hash of the poisoned data and may provide the hash of the poisoned data to the data manager.

Upon receipt of the hash of the poisoned data, the data manager may provide a one-time use key to the data source. The one-time use key may include a cryptographically verifiable statement authorizing the data source to utilize inference generation functionality of an inference model. The inference model may be trained to recognize data poisoning patterns (e.g., may be trained to identify labels associated with sequences of noise).

The inference model may ingest the poisoned data and may generate, as output, an inference. The inference may attempt to identify the data poisoning pattern added to the data. In addition, an inference model manager (e.g., an entity that hosts the inference model and is trusted to obtain the poisoned data) may generate a second hash of the poisoned data. The second hash may be intended to match the hash of the poisoned data. The second hash and the inference may be provided to the data manager.

The data manager may compare the second hash to the hash obtained from the data source to confirm that the data was not modified between the providing of the one-time use key and the generation of the inference. In addition, the data manager may determine whether the inference correctly identifies the data poisoning pattern. If the second hash matches the hash it may be confirmed that the data was not modified and if the inference correctly identifies the data poisoning pattern, the data manager may conclude that the data is verified as non-synthetic data.

The hash of the poisoned data may then be stored in the data repository. By verifying the data as non-synthetic data, other entities that may have access to the data (e.g., entities trusted by the data source to access the sensitive information content of the data) may use the hash of the poisoned data to verify integrity of a copy of the data.

Thus, embodiments disclosed herein may address, among other technical problems, the technical challenge of providing data verification services to data consumers without exposing potentially sensitive information content of the data. By verifying data as non-synthetic data using a data poisoning pattern and a hash of a poisoned copy of the data, a likelihood of exposing the sensitive information content may be reduced and a likelihood of facilitating provision of desired computer-implemented services based on the data may be increased.

In an embodiment, a method for managing data used to provide computer-implemented services by a data manager is disclosed. The method may include: making an identification that data from a data source is to be verified as non-synthetic data; obtaining, in response to the identification, a data poisoning pattern usable to modify the data to obtain poisoned data; obtaining, from the data source, a hash of the poisoned data; initiating an inference generation process to obtain: an inference generated by an inference model using the poisoned data, the inference being intended to identify the data poisoning pattern, and a second hash of the poisoned data; making a determination regarding whether the second hash matches the hash and the inference correctly identifies the data poisoning pattern; and in an instance of the determination in which the second hash matches the hash and the inference correctly predicts the data poisoning pattern: concluding that the data is verified as non-synthetic data; and storing the hash in a data repository.

The method may also include: obtaining, from a data consumer, a request for the hash; and providing, in response to the request, the hash to the data consumer for use in facilitating provision of the computer-implemented services.

Initiating the inference generation process may include, based the obtaining of the hash of the poisoned data from the data source, providing a one-time use key to the data source. The one-time use key may include a statement authorizing the data source to utilize the inference model to generate the inference and the second hash. The method may also include receiving, from an inference model manager, the inference and the second hash.

The one-time use key may also include a signature generated using a private key of a public private key pair maintained by the data manager. The signature may be verifiable by the inference model.

The data repository may include an immutable ledger including entries that are cryptographically verifiable, and the hash may be stored in one of the entries.

The data poisoning pattern may include a sequence of noise to be added to the data.

The data may never be obtained by the data manager, and the data manager may maintain the hash to enable other entities that obtain copies of the data to use the hash to verify integrity of the copies of the data.

The data manager may be owned by a first owner and the data source may be owned by a second owner.

The data source may not be controlled by the first owner.

Inference generating functionality of the inference model may be at least in part controlled by the first owner so that the second owner may be limited in ability to utilize the inference generating functionality to that authorized by the first owner.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, data generation services, and/or any other type of service that may be implemented with a computing device. Provision of the computer-implemented services may be facilitated, at least in part, using data obtained from any number of data sources.

To facilitate the provision of the computer-implemented services, a data consumer may obtain data (e.g., from a data source, from a third-party data manager). A quality of the computer-implemented services may be impacted by a quality of the data used to provide the computer-implemented services. For example, inclusion of synthetic data (e.g., data generated by a generative artificial intelligence (AI) model) in a dataset may reduce a quality of the dataset (e.g., by not reflecting real-world conditions), thereby reducing a quality of the computer-implemented services provided using the dataset. Inclusion of synthetic data in the dataset may also reduce a trustworthiness of the dataset and/or the computer-implemented services provided using the dataset. Thus, synthetic data may have a reduced likelihood of meeting the needs of the data consumer and/or a downstream consumer of the computer-implemented services.

In general, embodiments disclosed herein may provide methods, systems, and/or devices for verifying integrity of non-synthetic data (e.g., verifying that data includes non-synthetic data). To do so, data may be verified as non-synthetic by a data manager (e.g., a third party entity). By doing so, a likelihood of data consumers obtaining non-synthetic data for use in providing computer-implemented services may be increased.

However, the data may include sensitive information content that an owner of the data may desire to keep secret. For example, a data source may not wish to provide the data to the data manager for use in verifying that the data is non-synthetic. This may occur due to, for example, the data including PII, proprietary information (e.g., information confidential to a business), and/or for other reasons.

To verify the data as non-synthetic data without exposing the information content of the data, a data manager may perform a verification procedure without obtaining a copy of the data. To do so, upon determining that data generated by a data source is to be verified as non-synthetic data, a data manager may obtain a data poisoning pattern (e.g., from a data poisoning pattern database and/or based on a data poisoning policy). The data poisoning pattern (and/or the data poisoning policy from which the data poisoning pattern may be obtained) may have been previously provided to a data poisoner (e.g., an entity that manages poisoning of data) so that the data poisoner may have access to a copy of the data poisoning pattern.

The data poisoning pattern may include a sequence of noise to be added to the data. The sequence of noise may include any pattern of noise (e.g., randomly generated noise). The sequence of noise may not be recognizable and/or classifiable when added to the data (e.g., a human may not ascribe meaning to the noise, a classifying inference model may not classify the noise as a human-interpretable object). In addition, adding the sequence of noise to the data may not add or remove information content from the data such that a utility of the data to data consumers is negatively impacted (e.g., the sequence of noise may not corrupt the data). The data poisoning pattern may be associated with a label (e.g., any string of numbers and/or letters, a unique identifier) and the label may not be predictable by entities not provided with the label. For example, a random pattern may be labeled as CAT_2 even though an image of a cat may not be present in the random pattern and, therefore, a classifying model may not interpret the pattern of noise as related to an image of a cat. The relationship between the data poisoning pattern and the label may be known to the data manager. However, the relationship may not be known to other entities (e.g., the data source, an owner of the data, any other entity requesting verification of the data as non-synthetic data).

The data poisoner and/or the data source may add the sequence of noise to the data to obtain poisoned data. For example, the data may include video footage generated by a security camera and the data poisoning pattern may include a sequence of noise. To add the data poisoning pattern to the data, the sequence of noise may be superimposed over each frame of the video footage by modifying a set of pixels of each frame. A hashing process (e.g., using a one-way function) may be performed to obtain a hash of the poisoned data. The hash of the poisoned data may be provided to the data manager.

In response to obtaining the hash, the data manager may provide a one-time use key to the data source. The one-time use key may authorize the data source to utilize inference generation functionality of an inference model to generate an inference using the poisoned data as ingest. The inference model may be trained to identify data poisoning patterns (e.g., based on known relationships between data poisoning patterns and labels for the data poisoning patterns).

The inference model (and/or an entity managing the inference model) may verify the one-time use key. If the one-time use key is determined to be valid, the inference model may ingest the poisoned data and may generate, as output, an inference. The inference may include an identifier for the data poisoning pattern (e.g., the label). An entity hosting and operating the inference model (e.g., an inference model manager) may also generate a second hash of the poisoned data that was used as ingest to generate the inference.

The data manager may obtain the inference and the second hash of the poisoned data. To verify that the poisoned data used to generate the inference was the same as the poisoned data used to generate the hash of the poisoned data (and, therefore, the data manager may compare the second hash to the hash obtained from the data source (e.g., prior to providing the one-time use key). In addition, the data manager may determine whether the inference correctly identifies the data poisoning pattern.

If the hash matches the second hash and the inference correctly identifies the data poisoning pattern, the data may be verified as non-synthetic data. The hash may be compared to the second hash to confirm that the poisoned data was not modified after the hash was provided to the data manager and before the inference was generated. If the hash does not match the second hash, the data may be rejected for verification. The data manager may store the hash in a data repository and the hash may be usable by other entities (e.g., entities that may be authorized to access the data and may desire to use the data to perform computer-implemented services) to verify that the data is non-synthetic data.

By doing so, embodiments disclosed herein may improve a likelihood that data consumers obtain non-synthetic data usable to facilitate provisioning of computer-implemented services. By verifying integrity of non-synthetic data using a data poisoning pattern and a hash of a poisoned copy of the data, a likelihood of exposure of sensitive information content of the data may be reduced while increasing a likelihood of providing the computer-implemented services in a desired manner.

To provide the above noted functionality, the system of FIG. 1A may include data processing systems 100, data manager 102, and communication system 106. Each of these components is discussed below.

Data processing systems 100 may include any number and/or types of data processing systems (e.g., 100A-100N). Data processing systems 100 may include: (i) data sources, (ii) data poisoners, (iii) inference model managers, (iv) data consumers, and/or (v) other types of data processing systems (e.g., devices). Some of data processing systems 100 may be integrated into a single device (e.g., functionality of a data source and a data poisoner may be performed by a single device) and/or some of data processing systems 100 may include multiple devices (e.g., functionality of an inference model manager may be performed by multiple devices). In addition, any of data processing systems may be owned by the same and/or different owners. For example, a first owner may control access to inference generation functionality of an inference model manager and a second owner may control data collection functionality of a data source. The second owner may have limited access to the inference generation functionality (e.g., may only access a portion of the inference generation functionality, may access the inference generation functionality at certain times and/or for certain purposes) as dictated by the first owner. For additional details regarding data processing systems 100, refer to the description of FIG. 1B.

Data manager 102 may provide data management services for data consumers. Data manager 102 may include any number and/or type of devices such as data processing systems. To provide the data management services, data manager 102 may: (i) provide data poisoning patterns (e.g., as part of data poisoning policies) to data processing systems 100, (ii) maintain a data poisoning pattern database (e.g., including known relationships between data poisoning patterns and labels for the data poisoning patterns), (iii) perform operations to verify data as non-synthetic data without obtaining the data, (iv) store hashes of poisoned data in a data repository, (v) manage the data repository so that data consumers may request hashed copies of poisoned data from the data repository, and/or (vi) perform other tasks.

Functionality of data manager 102 may be performed by a single data processing system and/or multiple data processing systems. Data manager 102 may be owned by a first owner and the first owner may or may not control functionality of any of data processing systems 100. For example, the first owner may not control functionality of a data source (e.g., may not have access to data collected by the data source, may not manage data collection by the data source) and the first owner may control functionality of an inference model manager (e.g., the first owner may control when other entities may utilize inference generation functionality of inference models hosted by the inference model manager).

Data manager 102 may perform verification procedures for data without obtaining the data. To do so, data manager 102 may: (i) identify that data from a data source is to be verified as non-synthetic data, (ii) obtain, in response to the identifying, a data poisoning pattern (e.g., from a data poisoning pattern database) usable to modify the data to obtain poisoned data, (iii) obtain, from the data source, a hash of the poisoned data, (iv) initiate an inference generation process to obtain an inference generated by an inference model and a second hash of the poisoned data generated by the inference model, and/or (v) determine whether the second hash matches the hash and determine whether the inference correctly identifies the data poisoning pattern.

If the second hash matches the hash and the inference correctly identifies the data poisoning pattern, data manager 102 may: (i) conclude that the data is verified as non-synthetic data, (ii) store the hash in a data repository, and/or (iii) perform other actions.

Initiating the inference generation process may include: (i) obtaining a one-time use key authorizing the data source to utilize inference generation functionality of the inference model, and/or (ii) providing the one-time use key to the data source.

Figure 1B:
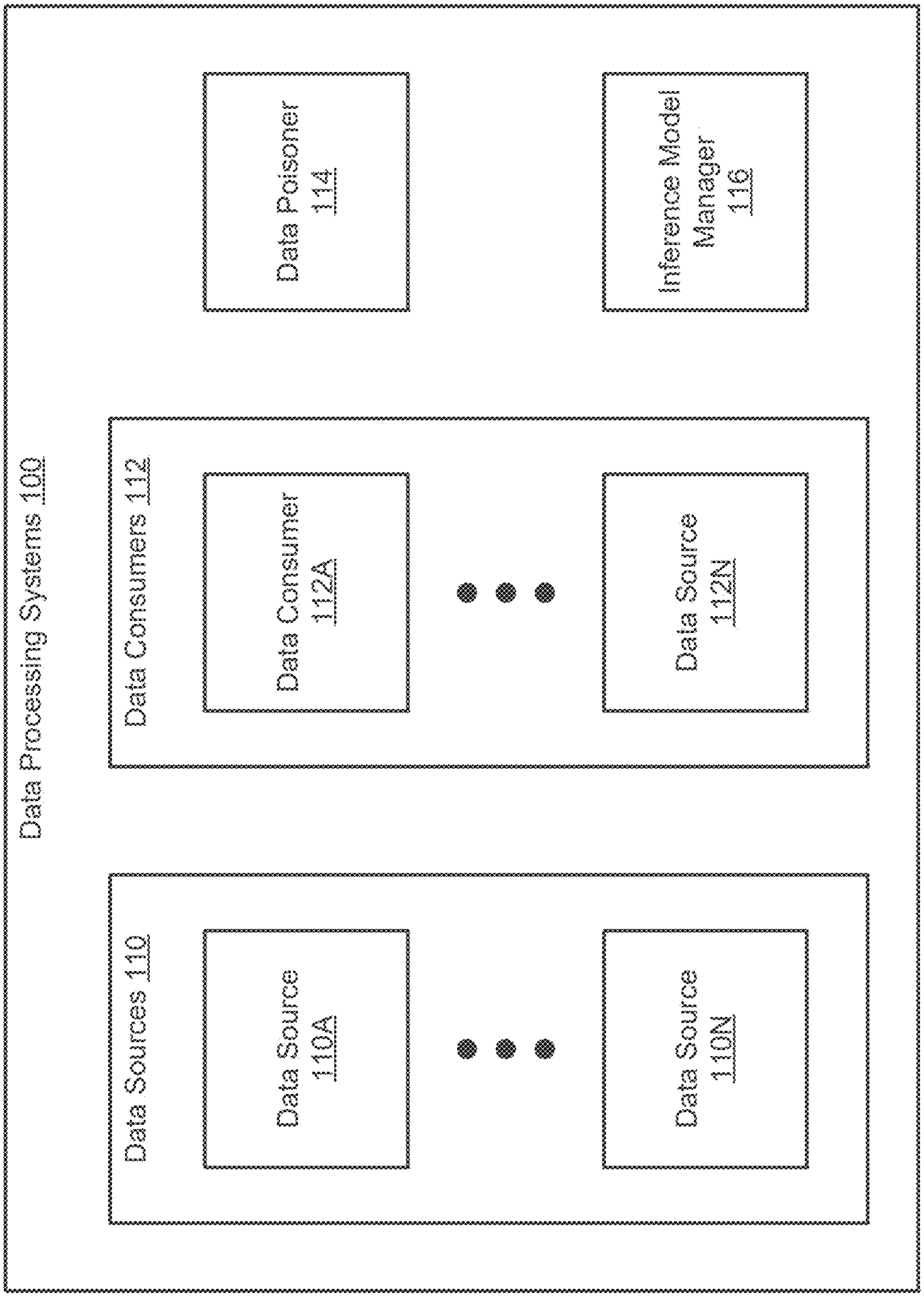
FIG. 1B shows a block diagram illustrating data processing systems in accordance with an embodiment.

Turning to FIG. 1B, a block diagram illustrating an example functional architecture of data processing systems 100 is shown. Data processing systems 100 may include at least data sources 110, data consumers 112, data poisoner 114, and inference model manager 116.

Data sources 110 may include any number of data sources (e.g., 110A-110N). Each data source of data sources 110 may include hardware and/or software components configured to obtain data, store data, provide data to other entities, and/or to perform any other task to facilitate provisioning of computer-implemented services. All, or a portion of, data sources 110 may provide data used to facilitate provisioning of the computer-implemented services to various computing devices operably connected to data sources 110. Different data sources may facilitate the provisioning of similar and/or different computer-implemented services.

Data sources 110 may include any type of devices adapted to collect, generate, and/or otherwise obtain data which is not synthetic (e.g., not generated by a generative AI model). For example, data sources 110 may include (i) sensors (e.g., motion sensors, temperature sensors, pressure sensors, infrared sensors), (ii) cameras (e.g., security cameras, traffic cameras, smartphone cameras), (iii) location tracking (e.g., global positioning system (GPS)) devices (e.g., GPS vehicle trackers, asset trackers, GPS-enabled smartphones), (iv) smart devices (e.g., smart streetlights, smart cars), (v) audio recording devices (e.g., microphones), (vi) connectivity devices (e.g., cell towers, Wi-Fi routers), and/or (vii) other types of data sources. Each data source of data sources 110 may be adapted to obtain (e.g., collect, measure) any type of data, such as numerical data, audio, images, video, text, etc.

The data obtained by data sources 110 may include sensitive information (e.g., PII, information confidential to a business) and, therefore, data sources 110 may restrict access to the data by other entities. For example, data sources 110 may never allow data manager 102 to obtain the data (e.g., refer to the description of FIG. 1A for details regarding data manager 102). However, other entities (e.g., one or more of data consumers 112) may be authorized to access the data to facilitate provision of computer-implemented services.

Data sources 110 may: (i) provide data verification requests (e.g., indicating that data obtained by data sources 110 is to be verified as non-synthetic data) to data manager 102, (ii) participate in data poisoning processes (e.g., cooperatively with data poisoner 114) to obtain poisoned data, (iii) generate hashes of poisoned data, (iv) provide the hashes of poisoned data to data manager 102, (v) obtain one-time use keys, (vi) provide the one-time use keys and poisoned data to inference model manager 120 to initiate inference generation, and/or (viii) perform other actions.

Data consumers 112 may provide and/or consume all, or a portion of, the computer-implemented services. Data consumers 112 may include any number of data consumers (e.g., 112A-112N) and may include, for example, businesses, individuals, and/or devices (e.g., data processing systems) that may obtain the data and/or other information based on the data to facilitate provisioning of the computer-implemented services. For example, data consumers 112 may use the data to train any number of inference models to generate responses when provided with ingest data. The responses may be used as a computer-implemented service and/or to provide the computer-implemented services to downstream consumers of the computer-implemented services.

Data poisoner 114 may oversee data poisoning processes. To do so, data poisoner 114 may obtain data poisoning patterns (and/or data poisoning policies from which data poisoning patterns may be obtained) from data manager 102 and may initiate poisoning of data using the data poisoning patterns. To do so, data poisoner 114 may add the data poisoning pattern to the data and/or may provide a sequence of noise included in the data poisoning pattern to another entity (e.g., if the data poisoner is not authorized to access the data) for use in poisoning the data, the entity being authorized to access the data (e.g., the data source, another trusted entity). Refer to the description of FIG. 2A for additional details regarding data poisoning processes.

Inference model manager 116 may train, host, and/or manage functionality of any number of inference models. For example, an inference model may be trained to identify data poisoning patterns. To do so, the inference model may be trained using a training data set including any number of data poisoning patterns and identifiers (e.g., labels) for the data poisoning patterns. The inference model training process may be performed by inference model manager 116 using the training data or by another entity.

Inference model manager 116 may obtain one-time use keys from entities requesting access to inference generation functionality of the inference model. The one-time use keys may include statements authorizing entities to access the inference generation functionality (e.g., at a particular time, for a particular purpose, using particular ingest data) and the statements may be cryptographically signed.

For example, data manager 102 may determine that data source 110A is authorized to utilize the inference generation functionality of the inference model. Data manager 102 may generate a one-time use key and may provide the one-time use key to data source 110A. The one-time use key may include a statement authorizing data source 110A to provide poisoned data as ingest for the inference model and the statement may be signed using a private key of a public private key pair kept secret by data manager 102.

Inference model manager 116 may utilize a public key of the public private key pair to verify that the one-time use key was signed using the private key. If the verification of the signature is successful, inference model manager 116 may obtain the poisoned data as ingest and may feed the poisoned data into the inference model to obtain an output, the output including an inference. Inference model manager 116 may also generate a second hash of the poisoned data (e.g., the ingest data used by the model), the second hash being intended to match a hash previously generated by data sources 110. Inference model manager 116 may then provide the inference and the second hash to data manager 102 for use in verifying the data as non-synthetic data. Refer to the description of FIG. 2B for additional details regarding verification of data as non-synthetic data.

Figure 2A:
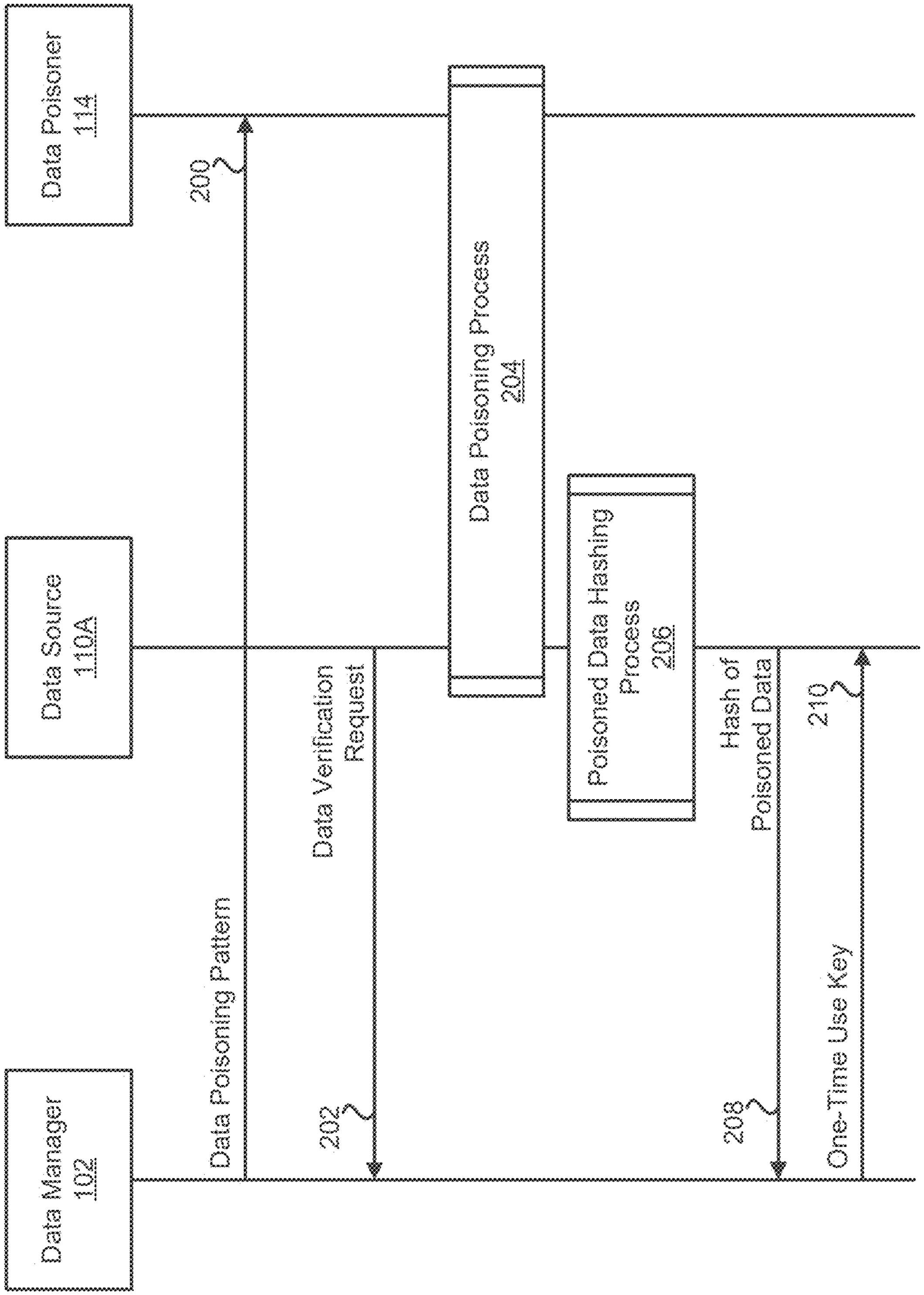
FIGS. 2A-2B show interaction diagrams in accordance with an embodiment.
Figure 2B:
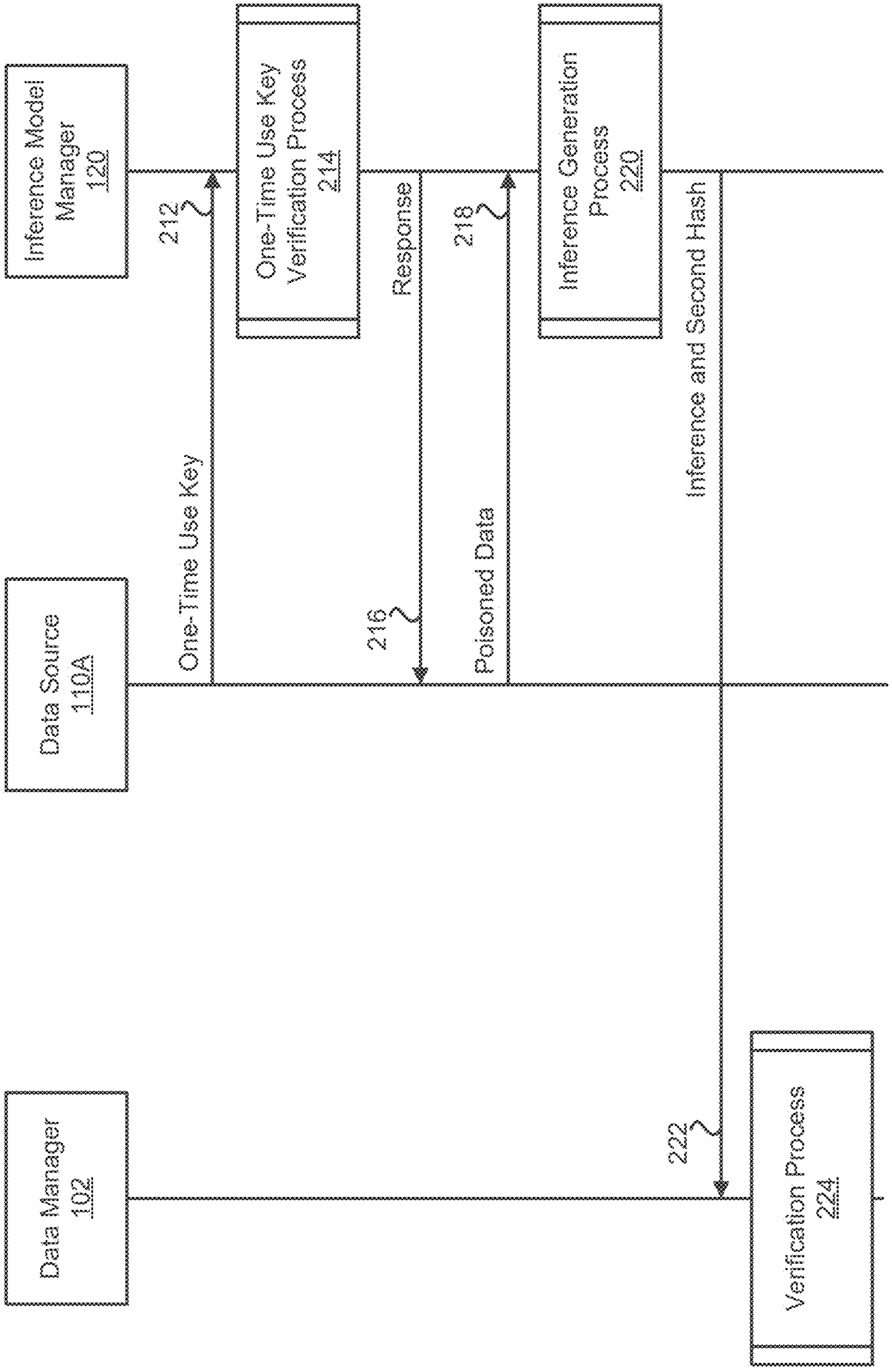
Figure 2C:
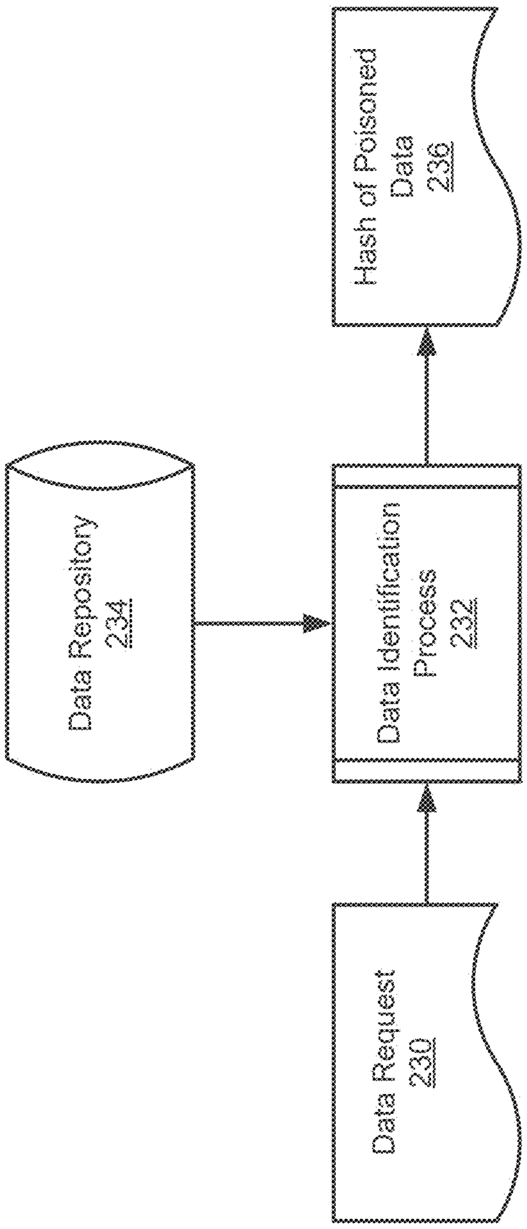
FIG. 2C shows a diagram illustrating a data flow in accordance with an embodiment.
Figure 3:
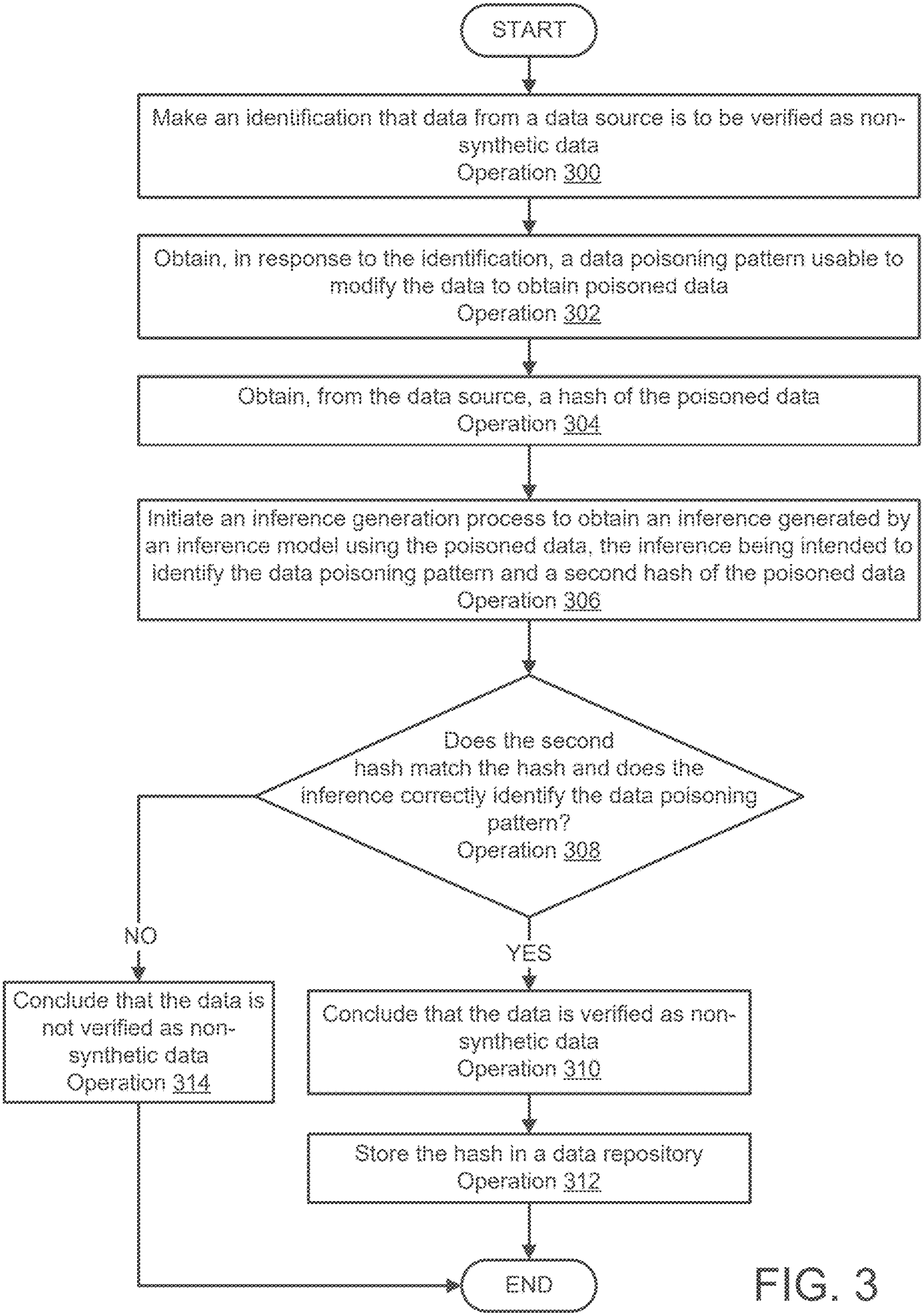
FIG. 3 shows a flow diagram illustrating a method for managing verification of data as non-synthetic data in accordance with an embodiment.

Returning to the description of FIG. 1A, when providing their functionality, any of (and/or components thereof) data processing systems 100 and/or data manager 102 may perform all, or a portion, of the actions and methods illustrated in FIGS. 2A-3.

Any of (and/or components thereof) data processing systems 100 and/or data manager 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIGS. 1A-1B as including a limited number of specific components, a system in accordance with an embodiment may include fewer, additional, and/or different components than those illustrated therein.

The system described in FIGS. 1A-1B may be used to manage data to improve an availability and/or quality of computer-implemented services provided to downstream consumers of the computer-implemented services. The following processes described in FIGS. 2A-2C may be performed by the system in FIGS. 1A-1B when providing this functionality.

To further clarify embodiments disclosed herein, interactions diagrams in accordance with an embodiment are shown in FIGS. 2A-2B. These interactions diagrams may illustrate how data may be obtained and used within the system of FIGS. 1A-1B.

In the interaction diagrams, processes performed by and interactions between components of a system in accordance with an embodiment are shown. In the diagrams, components of the system are illustrated using a first set of shapes (e.g., 102, 116A, etc.), located towards the top of each figure. Lines descend from these shapes. Processes performed by the components of the system are illustrated using a second set of shapes (e.g., 204, 206, etc.) superimposed over these lines. Interactions (e.g., communication, data transmissions, etc.) between the components of the system are illustrated using a third set of shapes (e.g., 200, 202, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 202. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during obtaining a hash of poisoned data.

Consider a scenario in which data collected by a data source (e.g., data source 110A) is to be verified as non-synthetic data by data manager 102. However, data source 110A may not wish to provide a copy of the data to data manager 102 (e.g., due to a sensitive information content of the data). Refer to the description of FIG. 1A for details regarding data manager 102 and refer to the description of FIG. 1B for details regarding data source 110A.

To verify the data as non-synthetic data, data manager 102 may obtain the hash of the poisoned data, the hash of the poisoned data being generated based on at least the data and not being usable by data manager 102 to obtain the information content of the data.

Prior to verifying the data as non-synthetic data (e.g., during a setup process for the system), a data poisoning pattern may be obtained and provided to any entity participating in data poisoning processes (e.g., data poisoner 114).

At interaction 200, the data poisoning pattern may be provided to data poisoner 114 by data manager 102. For example, the data poisoning pattern may be obtained (e.g., generated, read from storage) and provided to data poisoner 114 via (i) transmission via a message, (ii) storing in a storage with subsequent retrieval by data poisoner 114, (iii) via a publish-subscribe system where data poisoner 114 subscribes to updates from data manager 102 thereby causing a copy of the data poisoning pattern to be propagated to data poisoner 114, and/or via other processes. By providing the data poisoning pattern to data poisoner 114, data poisoner 114 may participate in data poisoning processes as part of verifying data as non-synthetic data.

The data poisoning pattern may be provided to data poisoner 114 as part of a data poisoning policy (not shown). The data poisoning policy may include any number of data poisoning patterns, a rule set for selecting one or more of the data poisoning patterns, instructions for performing data poisoning processes, and/or other information usable by data poisoner 114. Therefore, any entity with knowledge of the rule set (e.g., data manager 102, data poisoner 114) may obtain copies of the same data poisoning pattern for an instance of data poisoning without exchanging the data poisoning pattern during the data poisoning process.

To obtain the hash of the poisoned data, data manager 102 may obtain data verification request from data source 110A. At interaction 202, the data verification request may be provided to data manager 102 by data source 110A. For example, the data verification request may be generated and provided to data manager 102 via (i) transmission via a message, (ii) storing in a storage with subsequent retrieval by data manager 102, (iii) via a publish-subscribe system where data manager 102 subscribes to updates from data source 110A thereby causing a copy of the data verification request to be propagated to data manager 102, and/or via other processes. By providing the data verification request to data manager 102, data manager 102 may provide data verification services to data source 110A without obtaining copies of the data to be verified as non-synthetic data.

The data verification request may indicate at least: (i) that data obtained by data source 110A is to be verified as non-synthetic data, and (ii) that data manager 102 may not obtain a copy of the data. Obtaining the data verification request may trigger data manager 102 to obtain a data poisoning pattern (e.g., based on a data poisoning policy). The data poisoning pattern may be obtained by: (i) reading the data poisoning pattern from a data poisoning pattern database (e.g., maintained by data manager 102 and/or another entity), (ii) requesting the data poisoning pattern from another entity, (iii) generating the data poisoning pattern, and/or (iv) other methods.

The data poisoning pattern may include a sequence of noise that is to be added to the data to obtain poisoned data. For example, data source 110A may include a security camera positioned to collect video footage inside a factory. However, the video footage may include confidential information to be kept secret by an owner of the factory (e.g., may display proprietary processes, may include PII for individuals that work in the factory). Therefore, the owner of the factory may wish to verify the video footage as non-synthetic (e.g., for use by other entities trusted to view the video footage) without exposing the confidential information to data manager 102.

The data poisoning pattern may include a sequence of noise to be added to the data. The sequence of noise may include a randomly generated pattern of noise. The data poisoning pattern may be associated with a label (e.g., any string of numbers and/or letters, a unique identifier). The relationship between the data poisoning pattern and the label may be known to the data manager (e.g., may be stored in the data poisoning pattern database). However, the relationship may not be known to other entities (e.g., data source 110A, an owner of the data, any other entity requesting verification of the data as non-synthetic data).

To obtain poisoned data, data poisoning process 204 may be performed. During data poisoning process 204, data poisoner 114 may obtain the data poisoning pattern (e.g., previously obtained at interaction 200, based on a data poisoning policy). During data poisoning process 204, the data may be modified using the sequence of noise included in the data poisoning pattern (e.g., the sequence of noise may be added to the data). Data poisoning process 204 may be performed by data source 110A and/or data poisoner 114. For example, data poisoner 114 may obtain the data from data source 110A (e.g., if data poisoner 114 is authorized to obtain copies of the data) and data poisoner 114 may modify the data using the sequence of noise. Data poisoner 114 may then provide the poisoned data to data source 110A. If data poisoner 114 does not obtain the data, data source 110A may add the sequence of noise to the data to obtain poisoned data. Data poisoning process 204 may be performed via other methods without departing from embodiments disclosed herein. Refer to the description of FIG. 1B for additional details regarding data poisoner 114.

Continuing with the example in which the data includes video footage, adding the sequence of noise to the video footage may include modifying a set of pixels of each frame of the video footage. Therefore, each frame of the video footage may be modified to include the sequence of noise superimposed over the displayed image. The set of pixels may be the same for each frame and/or may be different (e.g., as dictated by the data poisoning policy). The label for the data poisoning pattern (e.g., that is known to data manager 102) may include a string of letters, numbers, and/or other characters such as CAT_2.

The sequence of noise may not be recognizable and/or classifiable when added to the data (e.g., a human may not ascribe meaning to the noise, a classifying inference model may not classify the noise as a human-interpretable object). In addition, adding the sequence of noise to the data may not add or remove information content from the data such that a utility of the data to data consumers is negatively impacted (e.g., the sequence of noise may not corrupt the data). The data poisoning pattern may be associated with a label (e.g., any string of numbers and/or letters, a unique identifier) and the label may not be predictable by entities not provided with the label. For example, a random pattern may be labeled as CAT_2 even though an image of a cat may not be present in the random pattern and, therefore, a classifying model may not interpret the pattern of noise as related to an image of a cat.

As a result of data poisoning process 204, poisoned data may be obtained by data source 110A (not shown). The poisoned data may be altered such that the data poisoning pattern may be detected by an inference model trained to identify data poisoning patterns. However, the data may not be modified to an extent that it is no longer usable by data consumers for provision of computer-implemented services based, at least in part, on the data.

To obtain the hash of the poisoned data, data source 110A may perform poisoned data hashing process 206. During poisoned data hashing process 206, a one-way function (e.g., a hash function) may be utilized to transform the poisoned data and to obtain the hash of the poisoned data. The hash function may not be reversable to obtain the poisoned data using the hash of the poisoned data. Therefore, the hash of the poisoned data may be provided to data manager 102.

At interaction 208, the hash of the poisoned data may be provided to data manager 102 by data source 110A. For example, the hash of the poisoned data may be generated and provided to data manager 102 via (i) transmission via a message, (ii) storing in a storage with subsequent retrieval by data manager 102, (iii) via a publish-subscribe system where data manager 102 subscribes to updates from data source 110A thereby causing a copy of the hash of the poisoned data to be propagated to data manager 102, and/or via other processes.

In response to obtaining the hash of the poisoned data, data manager 102 may provide a one-time use key to data source 110A at interaction 210. The one-time use key may include a cryptographically verifiable statement authorizing data source 110A to utilize inference generation functionality of an inference model. However, the authorization may be limited to one instance of inference generation (e.g., data source 110A may provide ingest to the inference model one time following verification of the one-time use key). The statement of authorization may be signed using a private key of a public private key pair kept secret by data manager 102. The public key of the public private key pair may be included in the one-time use key and/or may be otherwise available to data source 110A and/or other entities. Other information may be included with the one-time use key provided to data source 110A, including: (i) an identifier and/or other instructions indicating that the one-time use key is authorized for one-time, (ii) a copy of the hash of the poisoned data, and/or (iii) other information.

At interaction 210, the one-time use key and/or the other information may be provided to data source 110A by data manager 102. For example, the one-time use key may be generated and provided to data source 110A via (i) transmission via a message, (ii) storing in a storage with subsequent retrieval by data source 110A, (iii) via a publish-subscribe system where data source 110A subscribes to updates from data manager 102 thereby causing a copy of the one-time use key to be propagated to data source 110A, and/or via other processes. Refer to the description of FIG. 2B for additional details regarding use of the one-time use key and verification of the integrity of the data by data manager 102.

Turning to FIG. 2B, a second interaction diagram in accordance with an embodiment is shown. The second interaction diagram may illustrate processes and interactions that may occur during verification of the integrity of data (e.g., verification that the data includes non-synthetic data).

To verify the data as non-synthetic data, an inference generation process and a verification process may be performed. To perform the inference generation process (e.g., inference generation process 220), data source 110A may provide the one-time use key and/or other information, such as an identifier and/or a hash of the poisoned data, to inference model manager 120 for verification. Refer to the description of FIG. 2B for additional details regarding inference model manager 120.

At interaction 212, the one-time use key and/or the other information may be provided to inference model manager 120 by data source 110A. For example, the one-time use key may be obtained and provided to inference model manager 120 via (i) transmission via a message, (ii) storing in a storage with subsequent retrieval by inference model manager 120, (iii) via a publish-subscribe system where inference model manager 120 subscribes to updates from data source 110A thereby causing a copy of the one-time use key to be propagated to inference model manager 120, and/or via other processes. By providing the one-time use key to inference model manager 120, inference model manager 120 may determine whether data source 110A is authorized to utilize inference generation functionality of an inference model hosted by inference model manager 120.

To determine whether data source 110A is authorized to utilize inference generation functionality of the inference model, one-time use key verification process 214 may be performed. Inference generation functionality (e.g., inference generating functionality) of the inference model may be at least in part controlled by a first owner (e.g., the owner of data manager 102) so that a second owner (e.g., an owner of data source 110A) is limited in ability to utilize the inference generating functionality to that authorized by the first owner. For example, the one-time use key may include a statement authorizing data source 110A to utilize inference generating functionality of the inference model once using poisoned data as ingest.

During one-time use key verification process 214, a signature used to sign the one-time use key may be verified by inference model manager 120. To do so, a public key of the public private key pair associated with data manager 102 may be used to determine whether the private key of the public private key pair was used to generate the signature (e.g., using any key verification algorithm). Inference model manager 120 may generate a response indicating whether one-time use key verification process 214 was successful (e.g., if the private key was used to generate the signature).

At interaction 216, the response may be provided to data source 110A by inference model manager 120. For example, the response may be generated and provided to data source 110A via (i) transmission via a message, (ii) storing in a storage with subsequent retrieval by data source 110A, (iii) via a publish-subscribe system where data source 110A subscribes to updates from inference model manager 120 thereby causing a copy of the response to be propagated to data source 110A, and/or via other processes. By providing the response to data source 110A, data source 110A may provide ingest data for the inference model to obtain an inference.

At interaction 218, the poisoned data may be provided to inference model manager 120 by data source 110A. For example, the poisoned data may be generated and provided to inference model manager 120 via (i) transmission via a message, (ii) storing in a storage with subsequent retrieval by inference model manager 120, (iii) via a publish-subscribe system where inference model manager 120 subscribes to updates from data source 110A thereby causing a copy of the poisoned data to be propagated to inference model manager 120, and/or via other processes. By providing the poisoned data to inference model manager 120, inference model manager 120 may perform inference generation process 220.

While described herein as the one-time use key being verified prior to providing the poisoned data to inference model manager 120, it may be appreciated that the one-time use key and the poisoned data may be provided to inference model manager 120 concurrently so that inference model manager 120 may perform inference generation process 220 following one-time use key verification process 214 (e.g., with or without providing the response to data source 110A).

During inference generation process 220, the poisoned data may be fed into the inference model as ingest. The inference model may be an artificial intelligence (AI) inference model and may include a neural network. The inference model may be trained to map patterns to corresponding labels. For example, the patterns the inference model is trained to map to corresponding labels may include the data poisoning patterns. The labels may not be ascribed in a manner that other inference models may easily predict them. For example, a random pattern of noise may be labeled as "cat" even though a cat may not be depicted in the pattern of noise. Therefore, the inference model may be trained to hallucinate that a cat is present in the image and other inference models (e.g., classifying inference models, object recognition inference models) may not identify a cat in the image.

During inference generation process 220, inference model manager 120 may generate a second hash of the poisoned data. The second hash may be intended to match the hash generated by data source 110A and provided to data manager 102 at interaction 208 in FIG. 2A.

Therefore, during inference generation process 220, an inference and a second hash of the poisoned data may be generated. The inference may be intended to identify the data poisoning pattern (e.g., may include the label associated with the data poisoning pattern) used during data poisoning process 204 to obtain the poisoned data.

At interaction 222, the inference and the second hash may be provided to data manager 102 by inference model manager 120. For example, the inference and the second hash may be generated and provided to data manager 102 via (i) transmission via a message, (ii) storing in a storage with subsequent retrieval by data manager 102, (iii) via a publish-subscribe system where data manager 102 subscribes to updates from inference model manager 120 thereby causing a copy of the inference and the second hash to be propagated to data manager 102, and/or via other processes. By providing the inference and second hash to data manager 102, data manager 102 may perform verification process 224 to determine whether the data is to be verified as non-synthetic data.

During verification process 224, data manager 102 may compare the second hash to the hash to determine whether the second hash matches the first hash. By doing so, it may be determined whether the poisoned data was used to generate the inference (e.g., without modifications prior to inference generation process 220). In addition, during verification process 224, data manager 102 may determine whether the inference correctly identifies the data poisoning pattern.

For example, the inference model may have identified the sequence of noise and, based on the training data used to train the inference model, may have identified the instance of data poisoning as CAT_2. Data manager 102 may compare the inference to the data poisoning pattern provided (in FIG. 2A) to data poisoner 114 to determine whether the instance of data poisoning is correctly identified.

If the second hash matches the hash (e.g., indicating that the data was not modified after obtaining the one-time use key and before inference generation process 220) and the inference correctly identifies the data poisoning pattern, it may be concluded that the data is verified as non-synthetic data and data manager 102 may store a copy of the hash of the poisoned data in a data repository. The data repository may be maintained by data manager 102 so that other entities may use the hash to verify integrity of copies of data obtained by entities authorized to obtain the data. Refer to the description of FIG. 2C for additional details regarding the data repository.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, verification of data as non-synthetic data without obtaining a copy of the data may be accomplished via processes and interactions shown in FIGS. 2A-2B. By doing so, a data repository may be maintained that includes the hash of the poisoned data. The hash of the poisoned data may be usable by other entities to verify integrity of the data.

To further clarify embodiments disclosed herein, a data flow diagram in accordance with an embodiment is shown in FIG. 2C. In this diagram, flows of data and processing of data are illustrated using different sets of shapes. A first set of shapes (e.g., 230, 236, etc.) is used to represent data structures, a second set of shapes (e.g., 232, etc.) is used to represent processes performed using and/or that generate data, and a third set of shapes (e.g., 234, etc.) is used to represent large scale data structures such as databases.

Turning to FIG. 2C, a data flow diagram in accordance with an embodiment is shown. The data flow diagram may illustrate data used in and data processing performed in providing hashes of poisoned data (e.g., hash of poisoned data 236) to a data consumer upon obtaining a request for the hash of the poisoned data (e.g., data request 230).

To provide the hash of the poisoned data to the data consumer, data identification process 232 may be performed. During data identification process 232, data request 230 may be obtained. Data request 230 may include a request for the hash of the poisoned data from the data consumer, and may indicate a data source from which the data was obtained, a type of the data, a timestamp associated with the data, and/or other information usable to identify the hash of the poisoned data that corresponds to the data the data consumer is attempting to verify. Data request 230 may be obtained, for example, by an entity responsible for maintaining data repository 234 (e.g., data manager 102, not shown).

Data repository 234 may include an immutable ledger including entries that are cryptographically verifiable (e.g., a blockchain) and hash of poisoned data 236 may be stored in one of the entries. For example, data repository 234 may be implemented as a blockchain where each entry includes metadata blocks chained together to form an immutable (e.g., non-editable) data structure. The metadata blocks may be added to the blockchain using any method (e.g., consensus, proof of work, proof of interest) and may include: (i) the hash, (ii) an identifier usable to determine which data corresponds to the hash (e.g., via the data source maintaining a copy of the identifier with the data) (iii) entity identifiers indicating entities which added the metadata blocks, (iv) authentication data usable to validate that the entities which added the metadata blocks are trusted entities (e.g., cryptographically verifiable signatures), and/or (vi) other data.

Modification of an entry of data repository 234 may be restricted to trusted entities. To determine whether an entry in data repository 234 is trusted (e.g., was not modified by an unauthorized entity), authentication data for each metadata block may be used to validate the entry. Validating the entry may include: (i) comparing the entity identifiers to those of trusted entities to attempt to find a match (e.g., lack of a match may indicate that the corresponding entry is not to be trusted), (ii) using the authentication data in each respective metadata block to validate that the metadata block was, in fact, added by the entity identified by the entity identifier (e.g., using a public key of a public private key pair maintained by the entity to validate that the signature was added by the entity). For example, a unilateral or bilateral authentication process may be performed using the authentication data (or through a third, intermediate entity such as an authentication service). If all the metadata blocks are indicated to be added by a trusted entity and can be authenticated, then the entry may be trusted. Otherwise, the entry may not be trusted.

As part of performing data identification process 232, hash of poisoned data 236 may be obtained, based on data request 230, from data repository 234. To obtain hash of poisoned data 236, a lookup may be performed in data repository 234 using at least a portion of data request 230 as a key to identify at least one entry which includes hash of poisoned data 236. For example, hashes stored in data repository 234 may be tagged with identifiers and/or other metadata (e.g., the data source associated with the hash, a timestamp and/or type of data associated with the hash).

For example, hash of poisoned data 236 may have an identifier that was provided, by data manager 102, to data source 110A following verification process 224 described in FIG. 2B. Therefore, when a data consumer requests to verify integrity of the data prior to use of the data, data source 110A may provide the identifier to the data consumer. The data consumer may then provide the identifier as part of data request 230 and data manager 102 (not shown) may utilize the identifier to determine whether a hash is stored in data repository 234 that corresponds to the identifier.

If hash of poisoned data 236 corresponds to the identifier provided by data request 230 (e.g., and/or otherwise corresponds to the data desiring to be verified as non-synthetic data), a response to data request 230 may be provided to the data consumer to facilitate provisioning of computer-implemented services. The response may include hash of poisoned data 236 and/or an indication that hash of poisoned data 236 is stored in data repository 234 thereby indicating that the data was previously verified as non-synthetic. By providing hash of poisoned data 236 to the data consumer, the data consumer may generate, using a copy of the poisoned data (e.g., obtained from the data source), a corresponding third hash. The data consumer may compare the third hash to hash of poisoned data 236 to determine whether the data is the same as the data that was previously verified as non-synthetic.

Thus, by implementing the data flows shown in FIG. 2C, a system in accordance with embodiments disclosed herein may be used to provide hashes of poisoned data to a data consumer. By storing hashes in a data repository, a likelihood of efficiently verifying data as non-synthetic for data consumers may be increased thereby increasing a likelihood that verified non-synthetic data may be available for use in providing the computer-implemented services. Consequently, a likelihood that the computer-implemented services may be provided as desired to downstream consumers may also be increased.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to manage data used to provide computer-implemented services. FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing data used to provide computer-implemented services in accordance with an embodiment is shown. The method may be performed, for example, by any of the components of the system of FIGS. 1A-1B, and/or any other entity without departing from embodiments disclosed herein.

At operation 300, an identification may be made that data from a data source is to be verified as non-synthetic data. Making the identification may include: (i) receiving a data verification request from the data source (e.g., refer to interaction 202 in FIG. 2A), (ii) reading the data verification request from storage, (iii) receiving a notification from another entity that data obtained by the data source is to be verified as non-synthetic data, and/or (iv) other methods.

At operation 302, a data poisoning pattern may be obtained in response to the identification, the data poisoning pattern being usable to modify the data to obtain poisoned data. Obtaining the data poisoning pattern may include: (i) reading the data poisoning pattern from storage (e.g., randomly selecting a data poisoning pattern from a data poisoning pattern database, selecting the data poisoning pattern from the data poisoning database based on criteria), (ii) receiving the data poisoning pattern from another entity, (iii) generating the data poisoning pattern (e.g., based on a data poisoning policy), and/or (iv) other methods.

Prior to making the identification, at least the data poisoning pattern may be provided to a data poisoner. Providing the data poisoning pattern may include transmitting the data poisoning pattern in the form of a message over a communication system to the data source and/or other methods. Refer to interaction 200 in FIG. 2A for additional details regarding providing the data poisoning pattern to the data poisoner.

At operation 304, a hash of the poisoned data may be obtained from the data source. Obtaining the hash of the poisoned data may include receiving the hash of the poisoned data in the form of a message over a communication system and/or other methods. Refer to interaction 208 in FIG. 2A for additional details regarding the hash of the poisoned data and obtaining the hash of the poisoned data.

At operation 306, an inference generation process may be initiated to obtain an inference generated by the inference model using the poisoned data and a second hash of the poisoned data. The inference may be intended to identify the data poisoning pattern. Initiating the inference generation process may include providing, based on the obtaining of the hash of the poisoned data from the data source, a one-time use key (e.g., to the data source). The one-time use key may include a statement authorizing the data source to utilize the inference model to generate the inference and the second hash. Prior to providing the one-time use key to the data source, the one-time use key may be obtained by: (i) reading the one-time use key from storage, (ii) requesting the one-time use key from another entity, (iii) generating the one-time use key, and/or (iv) other methods.

Providing the one-time use key may include transmitting the one-time use key (e.g., via a communication system) in the form of a message to the data source and/or other methods. Refer to interaction 210 in FIG. 2A for additional details regarding providing the one-time use key.

Following providing the one-time use key, the inference and the second hash may be received from an inference model manager. Receiving the inference and the second hash may include receiving a transmission (e.g., a message) over a communication system from the inference model manager and/or other methods. Refer to interaction 222 in FIG. 2B for additional details regarding obtaining the inference and the second hash.

At operation 308 it may be determined whether the second hash matches the hash and whether the inference correctly identifies the data poisoning pattern. Determining whether the second hash matches the hash may include: (i) comparing the hash and the second hash (e.g., using a hash comparison algorithm), (ii) providing the hash and the second hash to another entity responsible for determining whether the second hash matches the hash, and/or (iii) other methods. Determining whether the inference correctly identifies the data poisoning pattern may include: (i) obtaining an identifier for the data poisoning pattern from the inference (e.g., parsing the inference, reading the identifier from the inference), (ii) comparing the identifier to a corresponding identifier (e.g., label) associated with the data poisoning pattern (e.g., in the data poisoning database), (iii) determining whether the identifier included in the inference matches the identifier included in the data poisoning pattern database, and/or (iv) other methods.

If the second hash matches the hash and the inference correctly identifies the data poisoning pattern, the method may proceed to operation 310.

At operation 310, it may be concluded that the data is verified as non-synthetic data. Concluding that the data is verified as non-synthetic data may include: (i) generating a data structure indicating that the data is verified as non-synthetic data, (ii) signing the data structure using a private key of a public private key pair, (iii) notifying the data source that the data is verified as non-synthetic data, and/or (iv) other methods.

At operation 312, the hash may be stored in a data repository. Storing the hash in the data repository may include: (i) signing the hash using a private key of a trusted entity, the private key being part of a public private key pair usable to cryptographically verify that the entity which signed the hash is the trusted entity, (ii) generating an entry in the data repository using the signed hash, and/or (iii) other methods. Storing the hash in the data repository may also include storing an identifier and/or other metadata usable to associate the hash with the data used to generate the hash in the entry.

Following storing the hash in the data repository, a request for the hash may be obtained from a data consumer. Obtaining the request for the hash may include: (i) reading the request from storage, (ii) receiving the request in the form of a message over a communication system, and/or (iii) other methods. In response to obtaining the request, the hash may be provided to the data consumer for use in facilitating provision of computer-implemented services. Providing the hash to the data consumer may include: (i) transmitting the hash to the data consumer in the form of a message over a communication system, (ii) storing the hash in a shared storage with the data consumer so the data consumer may retrieve the hash from the shared storage, and/or (iii) other methods.

The method may end following operation 312.

Returning to operation 308, the method may proceed to operation 314 if the second hash does not match the hash and/or if the inference does not correctly identify the data poisoning pattern.

At operation 314, it may be concluded that the data is not verified as non-synthetic data. Concluding that the data is not verified as non-synthetic data may include: (i) generating a data structure indicating that the data is not verified as non-synthetic data, (ii) storing the data structure in a database and/or other storage architecture, (iii) notifying (e.g., via a message over a communication system, via a graphical user interface (GUI) on a device) another entity (e.g., the data consumer) that the data is not verified as non-synthetic data, and/or (iv) other methods. Concluding the data is not verified as non-synthetic data may also include not storing the hash in the data repository.

The method may end following operation 314.

Thus, as illustrated above, embodiments disclosed herein may provide systems and methods usable to verify data as non-synthetic data, the non-synthetic data being usable to facilitate provisioning of computer-implemented services. By verifying the data as non-synthetic data without obtaining a copy of the data, a likelihood of exposing sensitive information content of the data may be reduced while increasing a likelihood that non-synthetic data is available for use by data consumers. Consequently, a likelihood of providing the computer-implemented services as desired may be increased.

Figure 4:
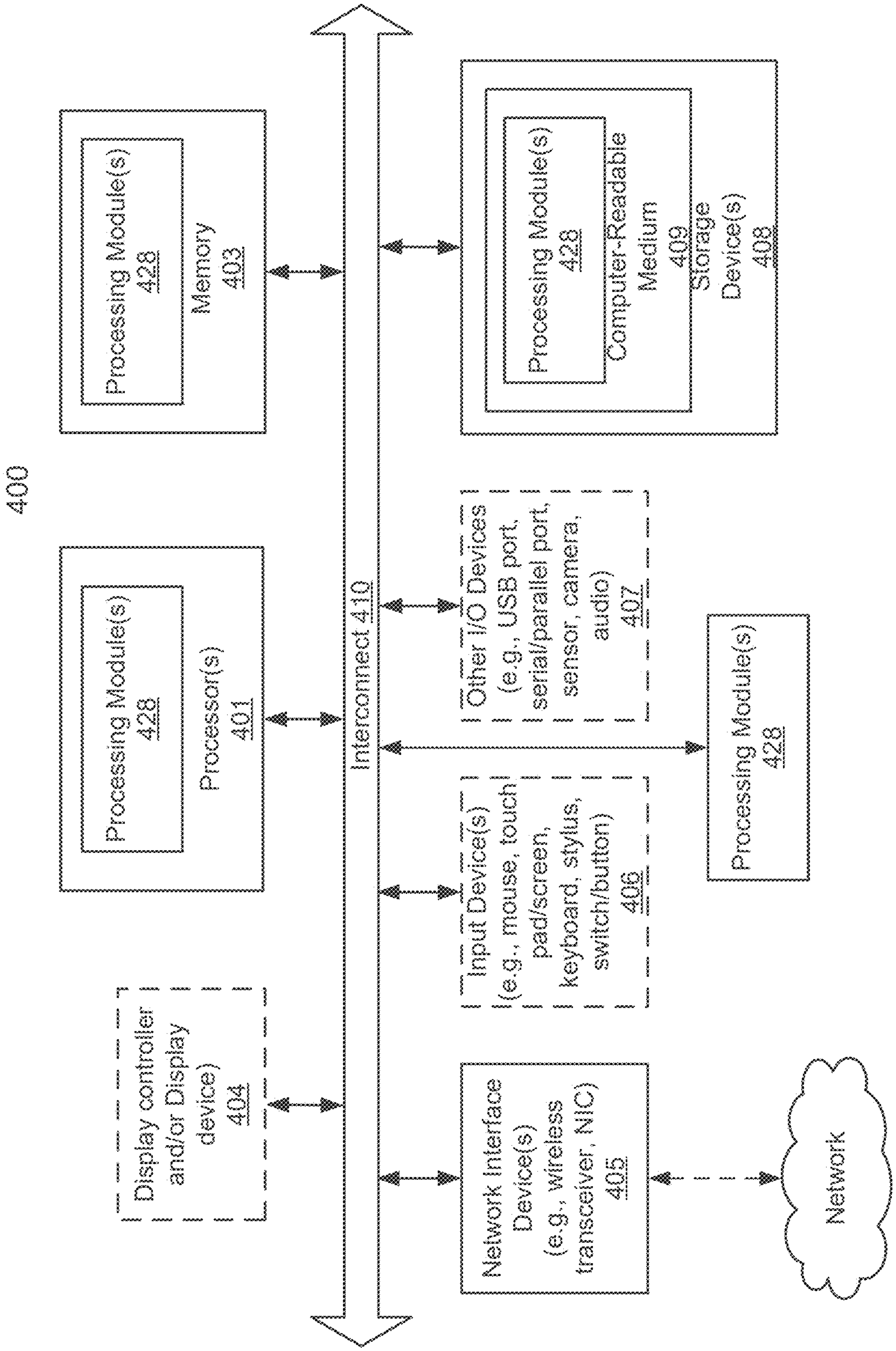
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data used to provide computer-implemented services by a data manager, the method comprising:

making an identification that data from a data source is to be verified as non-synthetic data;

obtaining, in response to the identification, a data poisoning pattern usable to modify the data to obtain poisoned data;

obtaining, from the data source, a hash of the poisoned data;

based on the obtaining of the hash of the poisoned data from the data source, initiating an inference generation process by providing a one-time use key to the data source, wherein the one-time use key comprises a statement authorizing the data source to utilize an inference model manager that hosts an inference model, and wherein the statement authorizes the data source to provide the poisoned data to the inference model manager that generates:

an inference using the poisoned data, the inference being intended to identify the data poisoning pattern, and a second hash of the poisoned data;

receiving, from the inference model manager, the inference and the second hash;

making a determination regarding whether the second hash matches the hash and the inference correctly identifies the data poisoning pattern; and in an instance of the determination in which the second hash matches the hash and the inference correctly predicts the data poisoning pattern:

concluding that the data is verified as non-synthetic data;

storing the hash in a data repository;

obtaining, from a data consumer, a request for the hash; and providing, in response to the request, the hash to the data consumer for use in facilitating provision of the computer-implemented services.

2. The method of claim 1, wherein the one-time use key further comprises a signature generated using a private key of a public private key pair maintained by the data manager, the signature being verifiable by the inference model.

3. The method of claim 1, wherein the data repository comprises an immutable ledger comprising entries that are cryptographically verifiable, and the hash is stored in one of the entries.

4. The method of claim 1, wherein the data poisoning pattern comprises a sequence of noise to be added to the data.

5. The method of claim 1, wherein the data is never obtained by the data manager, and the data manager maintains the hash to enable other entities that obtain copies of the data to use the hash to verify integrity of the copies of the data.

6. The method of claim 1, wherein the data manager is owned by a first owner and the data source is owned by a second owner.

7. The method of claim 6, wherein the data source is not controlled by the first owner.

8. The method of claim 7, wherein inference generating functionality of the inference model is at least in part controlled by the first owner so that the second owner is limited in ability to utilize the inference generating functionality to that authorized by the first owner.

9. The method of claim 1, wherein the initiating of the inference generation process includes configuring the one-time use key to be provided, from the data source and to the inference model manager, via a publish-subscribe system where inference model manager subscribes to updates from the data source to cause a copy of the one-time use key to be propagated to the inference model manager.

10. The method of claim 9, wherein the initiating of the inference generation process includes configuring the one-time use key and the poisoned data to be provided concurrently from the data source to the inference model manager.

11. The method of claim 10, the statement authorizes the data source to provide the poisoned data to the inference model manager without a response to a validation of the one-time use key.

12. The method of claim 11, the statement authorizes the data source to provide the poisoned data to the inference model manager via the publish-subscribe system to cause a copy of the poisoned data to be propagated to the inference model manager.

13. A non-transitory machine-readable medium having instructions stored therein, which when executed by a processor, cause the processor to perform operations for managing data used to provide computer-implemented services by a data manager, the operations comprising:

making an identification that data from a data source is to be verified as non-synthetic data;

obtaining, in response to the identification, a data poisoning pattern usable to modify the data to obtain poisoned data;

obtaining, from the data source, a hash of the poisoned data;

based on the obtaining of the hash of the poisoned data from the data source, initiating an inference generation process by providing a one-time use key to the data source, wherein the one-time use key comprises a statement authorizing the data source to utilize an inference model manager that hosts an inference model, and wherein the statement authorizes the data source to provide the poisoned data to the inference model manager that generates:

an inference using the poisoned data, the inference being intended to identify the data poisoning pattern, and a second hash of the poisoned data generated by the inference model;

receiving, from the inference model manager, the inference and the second hash;

making a determination regarding whether the second hash matches the hash and the inference correctly identifies the data poisoning pattern; and in an instance of the determination in which the second hash matches the hash and the inference correctly predicts the data poisoning pattern:

concluding that the data is verified as non-synthetic data;

storing the hash in a data repository;

obtaining, from a data consumer, a request for the hash; and providing, in response to the request, the hash to the data consumer for use in facilitating provision of the computer-implemented services.

14. The non-transitory machine-readable medium of claim 13, wherein the one-time use key further comprises a signature generated using a private key of a public private key pair maintained by the data manager, the signature being verifiable by the inference model.

15. The non-transitory machine-readable medium of claim 13, wherein the data repository comprises an immutable ledger comprising entries that are cryptographically verifiable, and the hash is stored in one of the entries.

16. The non-transitory machine-readable medium of claim 13, wherein the data is never obtained by the data manager, and the data manager maintains the hash to enable other entities that obtain copies of the data to use the hash to verify integrity of the copies of the data.

17. A data processing system, comprising:

a processor; and a memory coupled to the processor to store instructions, which when executed by the processor, cause the processor to perform operations for managing data used to provide computer-implemented services by a data manager, the operations comprising:

making an identification that data from a data source is to be verified as non-synthetic data;

obtaining, in response to the identification, a data poisoning pattern usable to modify the data to obtain poisoned data;

obtaining, from the data source, a hash of the poisoned data;

based on the obtaining of the hash of the poisoned data from the data source, initiating an inference generation process by providing a one-time use key to the data source, wherein the one-time use key comprises a statement authorizing the data source to utilize an inference model manager that hosts an inference model, and wherein the statement authorizes the data source to provide the poisoned data to the inference model manager that generates:

an inference using the poisoned data, the inference being intended to identify the data poisoning pattern, and a second hash of the poisoned data generated by the inference model;

receiving, from the inference model manager, the inference and the second hash;

making a determination regarding whether the second hash matches the hash and the inference correctly identifies the data poisoning pattern; and in an instance of the determination in which the second hash matches the hash and the inference correctly predicts the data poisoning pattern:

concluding that the data is verified as non-synthetic data;

storing the hash in a data repository;

obtaining, from a data consumer, a request for the hash; and providing, in response to the request, the hash to the data consumer for use in facilitating provision of the computer-implemented services.

18. The data processing system of claim 17, wherein the one-time use key further comprises a signature generated using a private key of a public private key pair maintained by the data manager, the signature being verifiable by the inference model.

19. The data processing system of claim 17, wherein the data repository comprises an immutable ledger comprising entries that are cryptographically verifiable, and the hash is stored in one of the entries.

20. The data processing system of claim 17, wherein the data is never obtained by the data manager, and the data manager maintains the hash to enable other entities that obtain copies of the data to use the hash to verify integrity of the copies of the data.

* * * * *